Feb. 2, 1926.
C. H. WILSON
PENETRATOR FOR TESTING PENETRATION HARDNESS
Filed Feb. 14, 1924
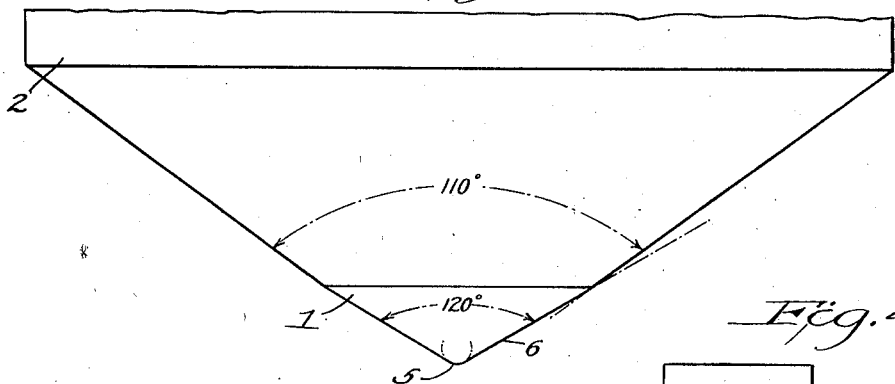
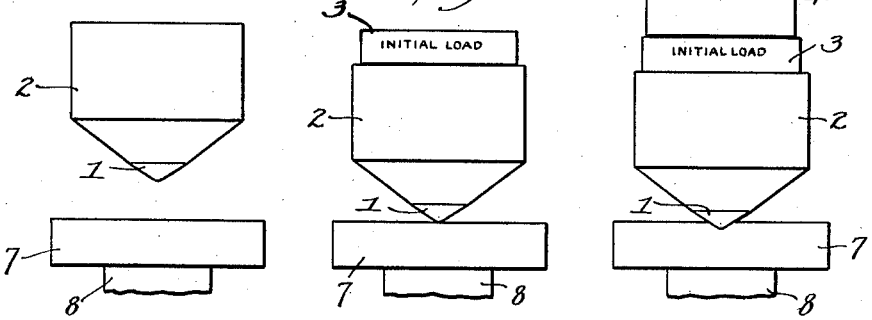
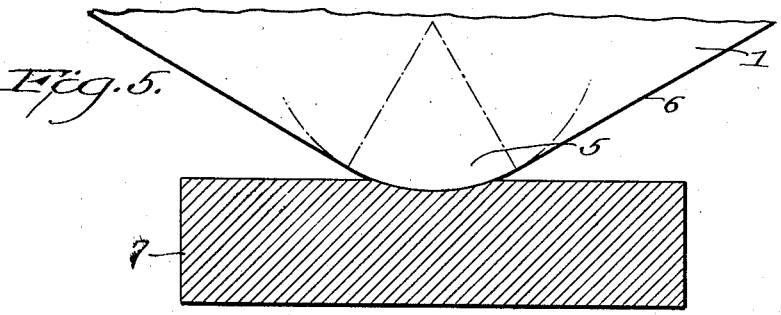
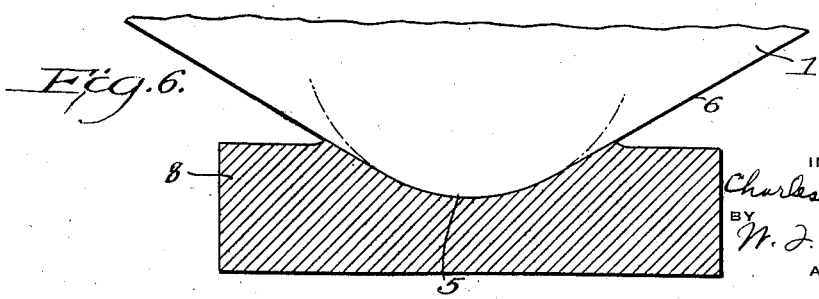
INVENTOR
Charles H. Wilson
BY
ATTORNEY Patented Feb. 2, 1926.

1,571,310

UNITED STATES PATENT OFFICE.

CHARLES H. WILSON, OF NORTH PELHAM, NEW YORK.

PENETRATOR FOR TESTING PENETRATION HARDNESS.

Application filed February 14, 1924. Serial No. 692,830.

*To all whom it may concern:*

Be it known that I, CHARLES H. WILSON, a citizen of the United States, residing at 68 Young Avenue, village of North Pelham, State of New York, have invented certain new and useful Improvements in Penetrators for Testing Penetration Hardness, of which the following is a specification.

My invention relates to penetrators used for testing the penetration hardness of materials and more particularly to a penetrator to be used in testing hard material as for example, hard steels and where shallow impressions or indentations are desired. One of the uses to which the invention may be put is the testing of hard materials by the Rockwell method of testing which includes the making of two superimposed impressions by the penetrator in the material, one with a minor load and the other with a major load and determining the difference in depth of impressions so produced.

One of the objects of the invention is to provide a penetrator which will be accurate and consistent in its results, which will be sensitive in responding to the degree of hardness of the material, which will not wear and which will not mar the appearance of the article under test, the penetrator making an inconspicuous indentation in the article. The penetrator also permits the utilization of a larger major load without deforming the penetrator or crushing the point.

With the above and other objects in view, my invention consists in the parts, improvements and combinations more fully pointed out hereinafter.

In the drawings:

Figure 1, shows the penetrator tip mounted upon its supporting holder, with part of the holder broken away.

Figures 2, 3 and 4, illustrate diagrammatically the action of the penetrator when testing. Figure 2 showing the penetrator out of contact with the work; Figure 3 in contact and with the initial load applied and Figure 4 illustrating the further penetration with the major load applied.

Figures 5 and 6, show diagrammatically and on an enlarged scale, the spherical segment and cone of the penetrator in operation.

The penetrator 1 may be made of any material equal or superior in hardness to quartz, a diamond being preferably used. It is mounted upon the holder 2 as by cement, the holder when used with the Rockwell method of testing being arranged in a machine so that pressure may be applied to the holder as by a minor and a major load. The minor load is indicated diagrammatically at 3 and the major load at 4. The difference in depth of impressions produced by the minor and major loads may be accurately measured. In measuring the penetration hardness of metals, it has been customary to force, with definite pressure, penetrators of conical or spherical shape into the metal to be tested, and to measure either the depth of penetration or the diameter of the impression at the surface of the penetrated metal and to employ such measurements or the relation of such measurements to the value of the impressing load, as an index or scale of hardness. In accordance with my invention I overcome the objections arising from the use of either spherical or conical penetrators. Conical penetrators tend to start penetration to an objectionable extent due merely to the contact making pressure applied for example by the minor load. Again, in testing thinner sheet metal, a conical penetrator tends to strike thru to the hard anvil supporting the thin metal. Moreover, the point of the cone tends to break away with use.

In accordance with my invention, I provide a spherical-conical penetrator, with spherical segment tip and frusto-conical side, the spherical segment being utilized to make the impression under the minor load and causing the penetrator to seat itself in the material, the spherical segment of the tip of the penetrator being then substantially submerged in the material. On continuing the penetration, by application of the major load, the frusto-conical side of the penetrator comes into play. By this means the penetrating property of the cone which operates under a different law from the penetrating property of the sphere, may be utilized to determine the depth of penetration, the cone having become the predominating penetrating element. It will be understood that a cone although starting with greater sensitivity of penetration than a sphere offers progressively greater increase in resistance to the penetration with the increase of depth of penetration, than does the sphere. The spherical segment of the tip, moreover, is made of such a radius and extent that penetration by the cone takes place during the application of the testing pressure, which in the case illustrated is the major load. The sides of the penetrator are constructed to progressively offer greater resistance to penetration with increase in depth than does the convex curved tip. The circle of tangency between the spherical and conical surfaces of the penetrator is forced by the testing pressure through and below the original surface of the material being tested. In measuring material of extreme hardness the spherical segment of very small diameter may act by itself as the penetrator, thus avoiding the necessity of utilizing a different penetrator for such extremely hard materials, at the same time securing a gradual transition in the scale of hardness. The spherical segment also preserves its shape without distortion.

Referring to the drawings, the spherical segment of the tip is shown at 5 and the frusto-conical side at 6. The work 7 is indicated supported upon the anvil 8.

The dotted sides of the impression show where the metal sometimes rises (see Figure 6), but as we are concerned with relative depths of penetration only, this is not material.

I have found that a penetrator in which the cone has an angle of approximately 120 degrees between its most opposite elements, and in which the spherical segment tip is provided with a spherical curvature tangent to the conical surface, the radius of the spherical segmental surface being between 0.20 and 0.23 millimeters, the arcuate extent of the spherical segment being about 60 degrees, constitutes the best embodiment of the invention. The depth of the spherical segment, i. e. the vertical distance between the outermost point of the spherical surface and the zone of tangency between the sphere and the cone, is less than half the radius of the sphere so that the sphere must penetrate the metal being tested very little before the cone comes into action.

Such a penetrator overcomes the objections above referred to and for the majority of hardness tests preserves the desired decrease of sensitivity with decrease of hardness in the metal tested, which in turn permits a heavy penetrating force without causing excessively deep indentations in softer metals. Deep indentations in the softer metals are objectionable frequently because the marketability or usefulness of the part may be affected, and, further, deep penetration bases the hardness reading on material further from the surface than would permit reasonable comparison with harder material where the test is more highly superficial.

Having thus described the invention, its operation will be clear. It will be understood that changes may be made in carrying the invention into effect without departing from the principle thereof.

What I claim and desire to secure for Letters Patent is:

1. A penetrator for testing the penetration hardness of material, said penetrator comprising a spherical segmental penetrating tip with frusto-conical penetrating sides, said sides forming an obtuse angle and meeting the tip tangentially to the spherical surface of the segment, said tip and sides penetrating the surface of the metal whose penetration hardness is being tested.

2. A penetrator for testing the penetration hardness of materials, said penetrator composed of a material equal or superior in hardness to quartz, said penetrator having that portion of its surface which comes into testing contact with and which penetrates the material to be tested made in the form of a cone having an angle of substantially 120 degrees, formed by any pair of its most opposite surface elements, the apex of the cone being shaped spherically to a radius of substantially 0.20, millimeters, the conical surface of the cone being tangential to the said spherical surface.

3. Means for measuring penetration hardness comprising in combination a penetrator, said penetrator comprising a spherical segmental penetrating tip with frusto-conical penetrating sides the depth of the spherical segmental tip being less than one-half of its radius, said tip and sides penetrating the surface of the metal whose penetration hardness is being tested, and means for applying a minor and thereafter a major load to the penetrator, the frusto-conical side of the penetrator coming into play under the application of the major load.

4. A penetrator for testing the penetration hardness of material, said penetrator having frusto-conical penetrating sides and terminating in a convexly curved penetrating tip, the sides meeting the curve of the tip tangentially to the surface of the tip, the depth of the curved tip being less than one half of its radius, said tip and sides penetrating the surface of the metal whose penetration hardness is being tested.

In testimony whereof, I have signed my name to this specification.

CHARLES H. WILSON.